J. F. OVERWYN.
AUTOMATIC VARIABLE SPEED TRANSMISSION.
APPLICATION FILED JUNE 30, 1920.
1,404,475.
Patented Jan. 24, 1922.
3 SHEETS—SHEET 3.
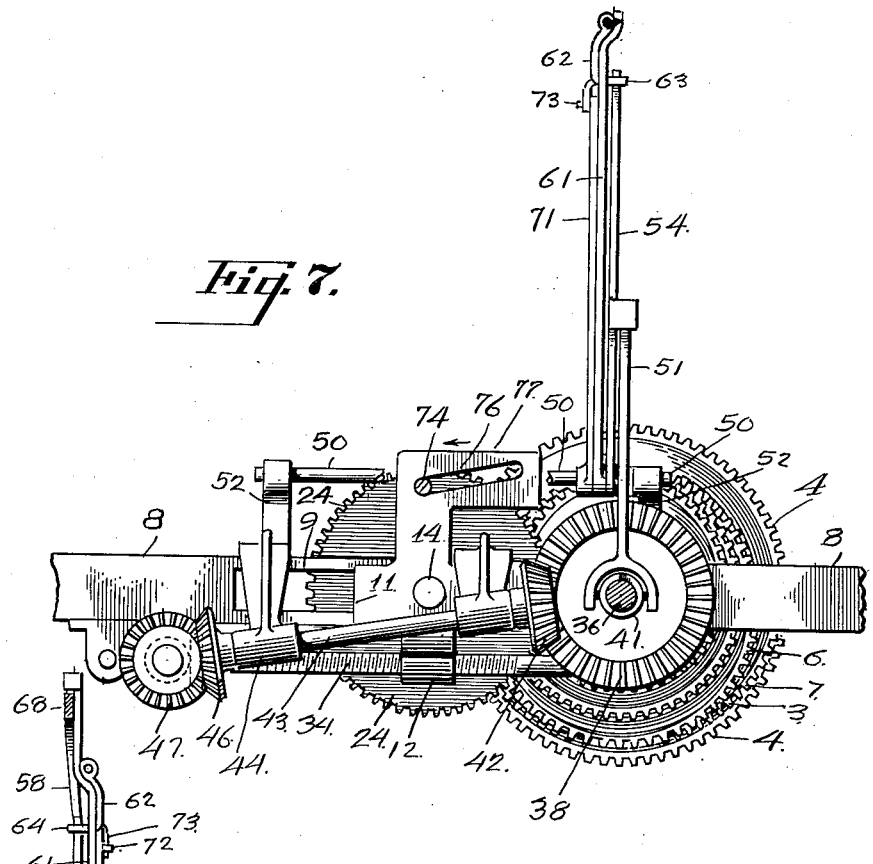
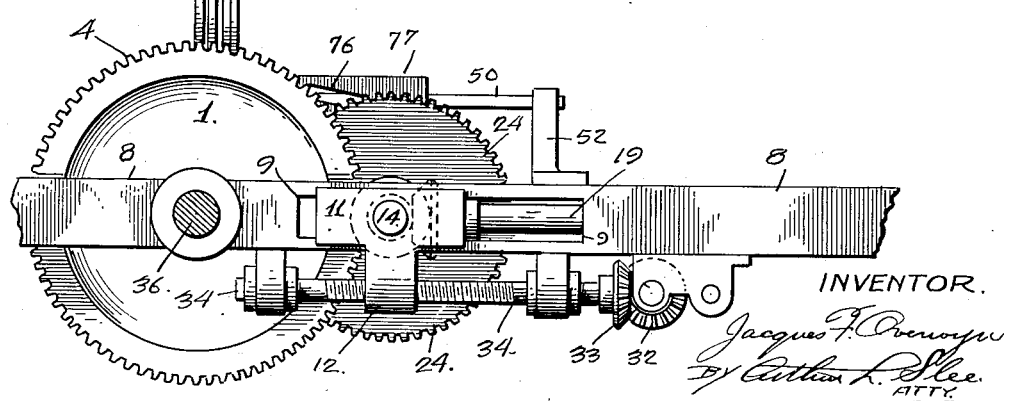
INVENTOR.
Jacques F. Overwyn
By Arthur L. Slee
ATTY.

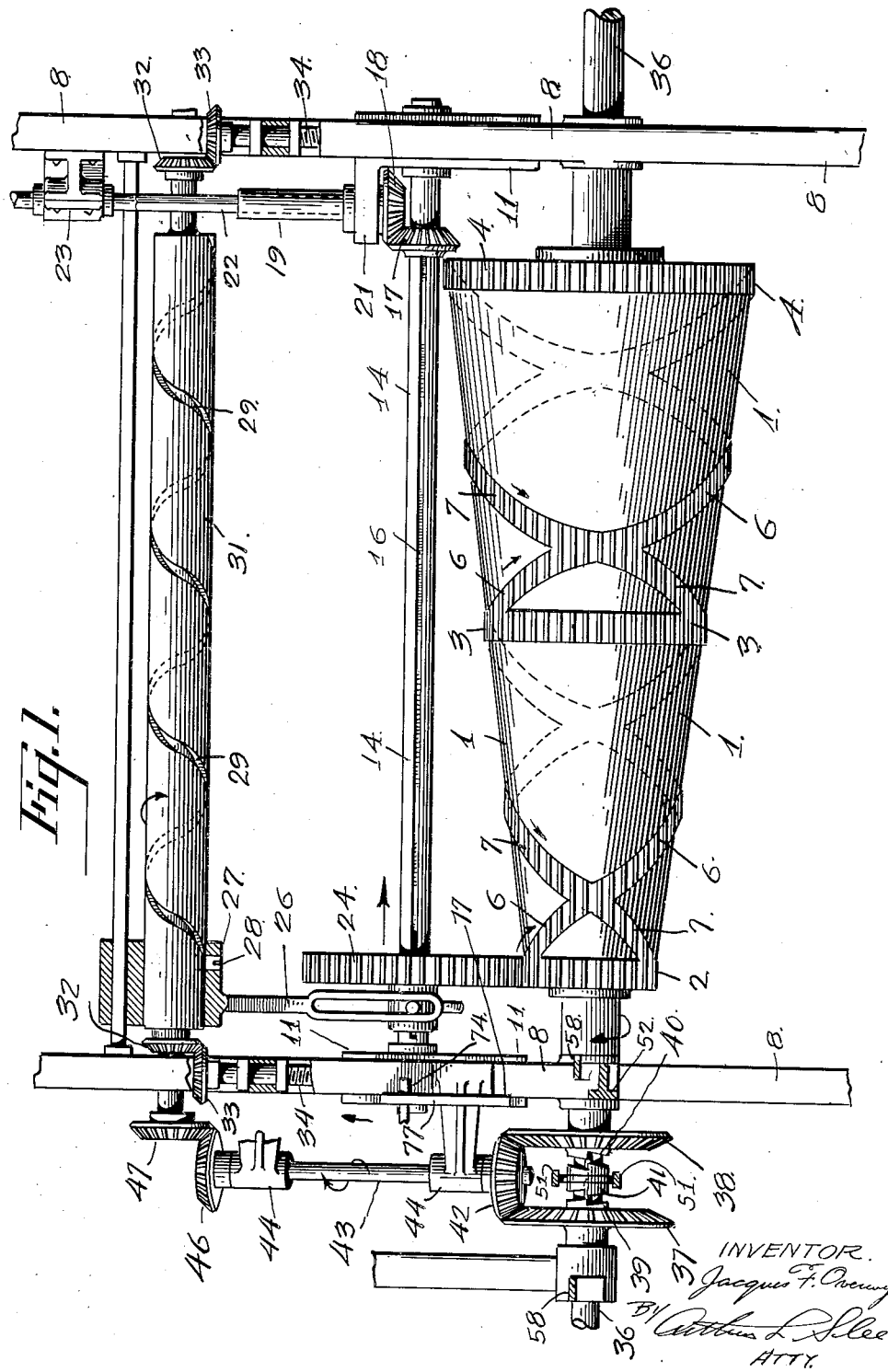

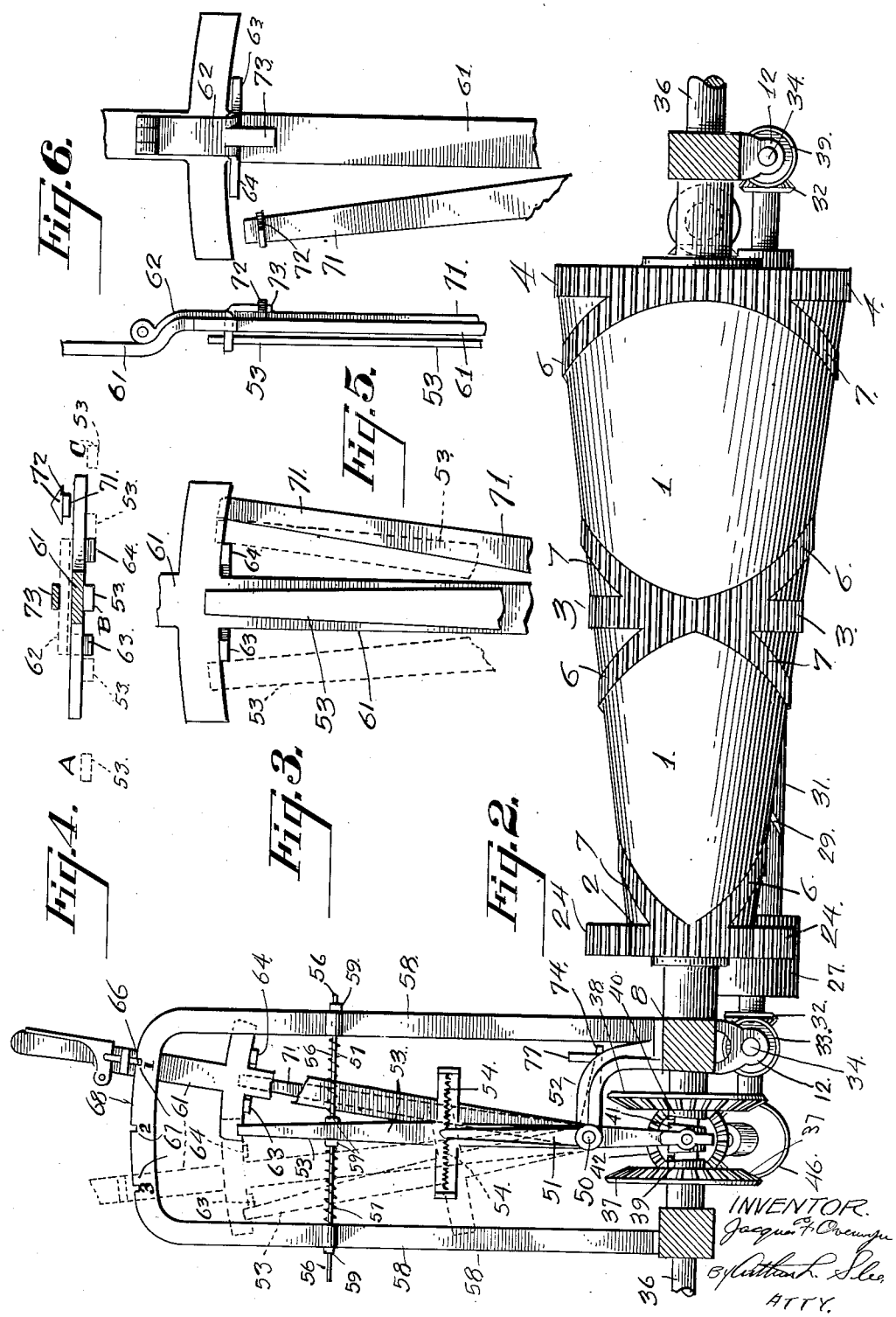

UNITED STATES PATENT OFFICE.

JACQUES F. OVERWYN, OF OILFIELDS, CALIFORNIA.

AUTOMATIC VARIABLE-SPEED TRANSMISSION.

1,404,475.   Specification of Letters Patent.   Patented Jan. 24, 1922.

Application filed June 30, 1920. Serial No. 394,353.

*To all whom it may concern:*

Be it known that I, JACQUES F. OVERWYN, a subject of the Queen of the Netherlands, residing at Oilfields, in the county of Fresno and State of California, have invented a new and useful Improvement in an Automatic Variable-Speed Transmission, of which the following is a specification.

My invention relates to improvements in an automatic variable speed transmission wherein a driven gear is constantly in mesh with one of the driving gears and operates in conjunction with a novel selective mechanism adapted to move said driven gear to the required gear ratio without disengaging the driven gear and then automatically discontinue the operation of said selective mechanism.

The primary object of the present invention is to provide an improved automatic variable speed transmission wherein the driving and driven elements are constantly in mesh thereby eliminating the stripping of gears and the consequent noises.

A further object of the present invention is to provide improved means of the character described having an improved selective mechanism adapted to select a given or required gear ratio and to move the parts to produce such ratio and then automatically discontinue the operation of said selective mechanism to maintain such ratio.

A still further object of the invention is to provide improved means whereby any one of a plurality of gear ratios may be automatically acquired by setting an operating lever to a position indicative of the required ratio.

I accomplish these and other objects by means of the improved device disclosed in the drawings forming a part of the present specification wherein like characters of reference are used to designate similar parts throughout the said specification and drawings, and in which—

Fig. 1 is a broken plan view, partly in section, of my improved transmission;

Fig. 2 is a front elevation of Fig. 1;

Fig. 3 is an enlarged broken detailed view of a portion of the selective mechanism.

Fig. 4 is a diagrammatic plan view of Fig. 3;

Fig. 5 is a broken side elevation of Fig. 4;

Fig. 6 is a broken rear elevation of Fig. 4;

Fig. 7 is a broken end elevation of the left hand end of Fig. 1; and

Fig. 8 is an end elevation of the opposite or right hand end of Fig. 1.

Referring to the drawings the numeral 1 is used to designate a rotatable cone having a plurality of spur gears 2, 3 and 4 thereon arranged in spaced relation and connected by oppositely positioned spiral gears 6, and 7, the teeth of all gears being of the same chord pitch.

The cone member 1 is rotatably mounted between two frame members 8, said members 8 being provided with longitudinally disposed slots 9 within which slots 9 are slidably mounted suitable bearing blocks 11 having depending nut portions 12, the purpose of which will hereinafter be more fully set forth.

A driven shaft 14, having a longitudinally disposed key seat 16 has the ends thereof rotatably mounted within the bearing blocks 11. A bevel gear 17 on the shaft 14 meshes with a similar gear 18 mounted upon a sleeve 19 in turn rotatably mounted within a bearing extension 21 of the adjacent bearing block 11 and slidably engages a square shaft 22 having a bearing 23 mounted upon the adjacent frame member 8.

A driven gear 24 is feathered upon the shaft 14 and is constantly in mesh with one of the gears on the cone member 1. A slotted arm 26 rotatably engages the hub of the driven gear 24 and is connected to a sleeve 27 provided with a lug or screw 28 which engages a spiral slot 29 within the periphery of a worm member 31 whose ends are also rotatably mounted within suitable bearings on the frame members 8.

The worm member 31 is provided with bevel gears 32 at each end thereof which engage similar gears 33 on threaded shafts 34 rotatably mounted under the frame members 8 and engaging the threaded or nut extensions 12 of the bearing blocks 11 slidably mounted within the slots 9 of said members 8.

The increase in the pitch diameters of the spur gears 2, 3 and 4 is directly proportional to the threads on the shafts 34 and to the spiral groove 29 in the worm member 31 so that rotation of said member 31 will operate the shafts 34 to move the sliding blocks 11 and the driven shaft 14 and gear 24 laterally to the axis of the cone 1 at a rate of speed which will constantly maintain the center of the shaft 14 and gear 24 thereon the correct distance from the gears in mesh therewith while said worm member 31 is moving the gear 24 along the shaft 14.

In other words, as the worm member 31 operates the sleeve 27 and arm 26 thereof to move the gear 24 along the shaft 14, the shafts 34 operate to move said shaft 14 and gear 24 away from or towards the longitudinal axis of the cone 1 so that the center of said shaft 14 and gear 24 will always be the correct distance from the gear being engaged.

In order to synchronize the movement of the gear 24 with the spiral gears 6 and 7 on the cone 1 the shaft 36 of the cone 1 has loosely mounted thereon oppositely faced bevel gears 37 and 38 having oppositely faced clutch members 39 and 40, respectively, thereon and arranged to be engaged by a double clutch member 41 feathered upon the shaft 36 and between said bevel gears 37 and 38.

The gears 37 and 38 are constantly in mesh with a bevel gear 42 upon one end of a counter shaft 43 rotatably mounted within suitable bearings 44 connected to the adjacent frame member 8. The other end of the counter shaft 43 is provided with a bevel gear 46 meshing with a bevel gear 47 connected to the worm member 31.

In the preferred form the pitch of the spiral groove 29 on the worm member 31 is one-half of the pitch of the spiral gears 6 and 7 on the cone 1 and the ratio of the gears 37 and 38 to the gear 42 is one to two so that said worm member 31 rotates twice as fast as the cone 1 when the clutch member 41 is engaging either one of the gears, 37 or 38.

The clutch member 41 is provided with one tooth or shoulder only as well as the clutch members 39 and 40 of the gears 37 and 38. By means of this novel arrangement the synchronism of the movement of the sleeve 27 when moving the gear 24 always coincides with the position of the spiral gears 6 and 7 on the cone 1.

Referring to Fig. 1 of the drawings, if the clutch member 41 be moved to the right the single shoulder thereon will engage the single shoulder of the clutch 40 of the gear 38 and rotate the shaft 43, worm member 31 and gear 24 in the direction indicated by the arrows.

The gear 24 will then be moved to the right along the shaft 14 and simultaneously climb the spiral gear 6 in the direction indicated by the arrows, until the selected spur gear 3 or 4 is reached when the clutch member 41 will be tripped in a manner hereinafter more fully described.

As the gear 24 is moved to the right by the worm member 31 the shafts 34 are simultaneously actuated to move the shaft 14 laterally and parallel away from the axis of the cone 1 by means of the nut extensions 12 of the sliding block bearings 11 within which the ends of said shaft 14 are rotatably mounted. The bearings 21 on the blocks 11 adjacent the gear 17 of the shaft 14 will simultaneously move the sleeve 19 and gear 18 thereon, meanwhile rotating the square shaft 22 from which the required speed is obtained, said shaft 22 telescoping into the sleeve 19 as said sleeve is moved longitudinally.

When the gear 24 is to be moved in the opposite direction the above described operation is reversed.

The gear 24 may be moved direct from either gear 2, 3 or 4 to any other gear without stopping on an intermediate gear, and automatically stopped and maintained in constant mesh with the selected gear by means of my improved selective mechanism which may be described as follows:

A gear shift lever 51 is rotatably mounted upon a shaft 50 rotatable in suitable brackets 52 on the adjacent frame member 8 and has its upper end connected to an operating lever 53 also pivotally connected to the shaft 50, by means of oppositely extending springs 54, said operating lever 53 being in turn normally centered in a neutral position by means of push rods 56 slidably connected to a frame 58 and provided with springs 57 to normally retain stops 59 against the frame 58 and the push rods in an extended position to normally center the operating lever 53.

A selective lever 61 has the lower end thereof pivotally mounted upon the shaft 50 in the brackets 52 and has a pawl 62 pivotally mounted upon the back of the upper end thereof, as disclosed in Figs. 5, 6, 7 and 8, of the drawings. The pawl 62 is provided with two outwardly projecting lugs 63 and 64 arranged to engage the top of the operating lever 53 when said selective lever 61 is moved in either direction whereby the clutch lever 51 may be operated to actuate the clutch, in a manner hereinafter more fully described.

The lever 61 is also provided with a latch 66 adapted for engagement with recesses 67 in the upper arcuate portion 68 of the frame 58.

A tripping lever 71 is rigidly secured to the shaft 50 and is provided at its upper end with a double faced cam 72 arranged to engage a lug 73 depending from the pawl 62, on the back of the upper end of the selective lever 61 to raise said pawl 62 to release the operating lever 53 from engagement with the selective lever 61.

An arm 74 is also rigidly secured to the shaft 50 in the brackets 52 and has its outer end projecting through an inclined slot 76 in an upwardly extending plate 77 secured to the adjacent sliding bearing block 11 within the slot 9 of the adjacent frame member 8 so that movement of said sliding block 11 will oscillate the shaft 50 and tripping lever 71.

Referring to Fig. 1 of the drawings it will be observed that the gear 24 is in mesh with the low or small gear, 2. While the gear 24 is in this position the other members of the selective mechanism will be in the position disclosed in full lines in Fig. 2 of the drawings.

If it is desired to move the gear 24 to high speed or in mesh with the spur gear 4 on the cone 1 the parts are operated as follows:

The latch 66 of the selective lever is released from the notch or recess marked 1, which indicates first or low speed, and the selective lever 61 is moved to the left, to the position indicated in dotted lines in Fig. 2 of the drawings. It will be observed that the lug 63 of the pawl 62 is held away from engaging position with the top of the operating lever 53 by means of the cam 72 on the tripping lever 71. It should also be noted that there is a slight space between the adjacent side of the lug 63 and the top of the operating lever 53 while the selective lever 61 is in low or first speed. But movement of the selective lever 61 away from the tripping lever 71 and cam 72 thereon will cause the lug 73 of the pawl 62 to move off of or away from said cam 72 in time for the pawl 62 to drop and the lug 63 to engage the side of the operating lever 53 and move said lever to the position indicated in dotted lines in Fig. 2 of the drawings, which position of the operating lever is also indicated by the dotted rectangle A in Fig. 4 of the drawings.

This position of the operating lever 53 will cause the proper spring 54 to move the clutch lever 51 to actuate the clutch 41 to engage the clutch 40 of the gear 38 and move the several parts in the manner hereinbefore described and thereby cause the gear 24 and other members of the selective mechanism to move in the directions indicated by the arrows in Fig. 1 of the drawings.

As the gear 24 moves toward the gear 3 on the cone 1 it is evident that the bearing block 11 with its extension 77 will also be moved in the direction indicated by the arrows in Figs. 1 and 7 of the drawings and the slot 76 will move the arm 74 to rotate the shaft 50 and move the tripping lever 71 to the left or toward the selective lever 61 which is in third position.

The movement of the tripping lever 71 is synchronous with the movement of the gear 24, worm member 31 and other parts of the selective and moving mechanism so that said tripping lever will arrive at a mid position on the arcuate portion 68 of the frame 58 simultaneously with the arrival of the gear 24 at the spur gear 3 on the cone 1.

Had the selective lever 61 been moved to mid-position or for intermediate speed the cam 72 would now engage the lug 73 and thereby release the operating lever 53 to prevent further movement of the selective mechanism and retain the gear 24 in mesh with the spur gear 3 on the cone 1. But inasmuch as the selective lever is at the third position the tripping cam 71 will continue to be moved by the movement of the plate or extension 77 until the cam 72 of the tripping lever 71 engages the lug 73 of the pawl 62 on the selective lever at third position, thereby releasing the operating lever 53 and permitting the springs 57 and rods 56 to return the said operating lever and clutch lever 51 to central or normal position B to disengage the clutch 41 and thereby automatically discontinue further operation of the selective mechanism and retain the gear 24 in mesh with the spur gear 4 on the cone 1.

The top of the lever 53 now being in central position as disclosed in full lines in Figs. 2, 3 and 4 of the drawings, and the selective lever 61 in the position disclosed in dotted lines in Fig. 2 of the drawings, it will be observed that the top of said operating lever 53 will lie to the right of the lug 64 of the pawl 62 on the selective lever 61, which pawl is held in a releasing position by the engagement of the cam 72 of the tripping lever 71 with the lug 73 of said pawl 62, which releasing position permitted the passage of the top end of the operating lever 53 to a normal position from the left side of the lug 63 when the pawl 62 was released by the action of the cam 72 on the tripping lever 71. Therefore, it will be seen that the movement of the selective lever 61 towards the left to either the intermediate or high recess cause the left side of the lug 64 of the pawl 62 on the selective lever 61 to engage the adjacent side of the operating lever 53, sufficient space being allowed between the right side of said lug 63 and the lever 53 to permit the movement of the selective lever 61 and the lug 73 of the pawl 62 to release said pawl from the cam 72 on the tripping lever 71 before encountering said operating lever 51.

If it is now desired to move from high to intermediate or second speed the selective lever is moved to the center recess 67 on the arcuate portion 68 of the frame 58 and such movement will cause the right side of the lug 64 to engage the operating lever 53 and move the same to the position indicated at C in Fig. 4 of the drawings, simultaneously actuating the clutch lever 51 to move the clutch member 41 into engagement with the clutch portion 39 of the bevel gear 37 thereby actuating the moving mechanism to move the gear 24 from the spur gear 4 on the cone 1, over the spiral gear 7, (which is wound oppositely to the spiral gear 6 used in going from lower to higher gear), to the spur gear 3, simultaneously moving the other members, such as the worm member 31 and the plate 77, to actuate the tripping lever 71 to move to mid position and thereby actuate the lug 73 and release the pawl 62 and return the clutch member 41 to normal or disengaging position.

From the foregoing it is obvious that I have provided an improved automatic variable speed transmission mechanism wherein any required speed may be obtained without unmeshing the gears.

It is also obvious that I have provided a new and improved selective mechanism adapted to move the several parts synchronously and to automatically discontinue further movement of the driven gear when the required position has been attained. It is also evident that any number of speeds may be obtained by the simple provision of providing more spur gears on the cone members 1.

It is further evident that the gear 24 may be moved from any one speed to any other required speed within the range of the device.

Having thus described my invention what I claim as new and desire to secure by Letters Patent is—

1. An automatic variable speed transmission mechanism comprising a cone having a plurality of spur gears of different diameters arranged in spaced relation and also spiral gears connecting said spur gears; a shaft arranged parallel with the cone axis; a driven gear feathered upon the shaft and in mesh with one of the gears on the cone; and means for moving the driven gear on the shaft without interruption from one gear on the cone to any other gear thereon through the agency of the spiral gears.

2. An automatic variable speed transmission mechanism comprising a cone having a plurality of spur gears of different diameters arranged in spaced relation and also spiral gears connecting said spur gears; a shaft arranged parallel with the cone axis; a driven gear feathered upon the shaft and in mesh with one of the gears on the cone; and means for moving the driven gear on the shaft from one gear on the cone to another thereon through the agency of the spiral gears; and means for moving the shaft laterally to the axis of the cone and for maintaining the same parallel with the cone when the driven gear is travelling on said cone; and selective mechanism arranged to move the driven gear from any one gear on the cone to any selected spur gear.

3. In an automatic variable speed transmission mechanism including a cone having gears of different diameters and a gear arranged to be driven therefrom, selective mechanism arranged to move the driven gear from any one gear on the cone to any selected spur gear; and for automatically stopping further movement of the driven gear and shaft when the said gear shall have reached said selected spur gear.

4. An automatic variable speed transmission mechanism comprising a driving shaft; a cone on the driving shaft; having a plurality of spur gears of different diameters thereon and connected by spiral gears of the same chord pitch; a driven gear in mesh with one of the gears on the cone; and means for moving the driven gear without interruption from any one spur gear on the cone over the spiral gears and to any other gear on said cone.

5. An automatic variable speed transmission mechanism comprising a driving shaft; a cone on the driving shaft having a plurality of spur gears of different diameters thereon and connected by spiral gears of the same chord pitch; a driven gear in mesh with one of the gears on the cone; and means for moving the driven gear from any one spur gear on the cone over the spiral gears and to any other gear on said cone; and selective means for connecting the moving means to the driving shaft for operation and arranged to automatically disconnect said moving means from said driving shaft when the driven gear shall have meshed with the selected spur gear.

6. An automatic variable speed transmission mechanism comprising a driving shaft; a cone on the driving shaft having a plurality of spur gears of different diameters and the same chord pitch in spaced relation connected by oppositely positioned spiral gears of the same chord pitch; a driven gear in mesh with one of the gears on the cone; and means for moving the driven gear without interruption, in either direction, from any one spur gear on the cone, over one of the spiral gears and to any other spur gear on said cone.

7. An automatic variable speed transmission mechanism comprising a driving shaft; a cone on the driving shaft having a plurality of spur gears of different diameters and the same chord pitch in spaced relation connected by oppositely positioned spiral gears of the same chord pitch; a driven gear in mesh with one of the gears on the cone; and means for moving the driven gear without interruption, in either direction, from any one spur gear on the cone, over one of the spiral gears and to any other spur gear on said cone; and selective means for connecting the moving means to the driving shaft for operation and arranged to automatically disconnect said moving means from said driving shaft when the driven gear is in mesh with the selected spur gear.

8. An automatic variable speed transmission mechanism comprising a driving shaft; a cone on the driving shaft having a plurality of spur gears in spaced relation thereon and of different diameters and the same chord pitch, and likewise having spiral gears of the same chord pitch as the spur gears connecting said spur gears; a driven gear in mesh with one of the spur gears; a follower arranged to move the driven gear parallel with the axis of the cone; and means for operating the follower in either direction to move the driven gear without interruption from any one spur gear, over the spiral gears to any other selected spur gear on said cone.

9. An automatic variable speed transmission mechanism comprising a driving shaft; a cone on the driving shaft having a plurality of spur gears in spaced relation thereon and of different diameters and the same chord pitch, and likewise having spiral gears of the same chord pitch as the spur gears connecting said spur gears; a driven gear in mesh with one of the spur gears; a follower arranged to move the driven gear parallel with the axis of the cone; and means for operating the follower in either direction to move the driven gear without interruption from any one spur gear, over the spiral gears to any other selected spur gear on said cone; and means for automatically discontinuing operation of the follower when the driven gear is in mesh with the selected gear.

10. An automatic variable speed transmission mechanism comprising a driving shaft; a cone on the driving shaft having a plurality of spur gears arranged in spaced relation thereon and of different diameters but of the same chord pitch, and oppositely positioned spiral gears, of the same chord pitch as the spur gears connecting said gears; a driven gear in mesh with one of the spur gears; a spirally grooved shaft arranged parallel with the axis of the cone; a follower mounted upon the spirally grooved shaft and operatively connected with the driven gear; and means for rotating the spirally grooved shaft in either direction and in synchronism with the spiral gears on the cone whereby the driven gear may be moved from any one gear on the cone over the spiral gears to any other selected gear on said cone.

11. An automatic variable speed transmission mechanism comprising a driving shaft; a cone on the driving shaft having a plurality of spur gears arranged in spaced relation thereon and of different diameters but of the same chord pitch, and oppositely positioned spiral gears, of the same chord pitch as the spur gears connecting said gears; a driven gear in mesh with one of the spur gears; a spirally grooved shaft arranged parallel with the axis of the cone; a follower mounted upon the spirally grooved shaft and operatively connected with the driven gear; and means for rotating the spirally grooved shaft in either direction and in synchronism with the spiral gears on the cone whereby the driven gear may be moved from any one gear on the cone over the spiral gears to any other selected gear on said cone; and means for automatically disconnecting the rotating means from the spirally grooved shaft when the driven gear is in mesh with the selected spur gear.

12. An automatic variable speed transmission mechanism comprising a driving shaft; a cone mounted on the driving shaft and having a plurality of spur gears in spaced relation thereon and of different diameters but of the same chord pitch; spiral gears mounted upon the cone and connecting the spur gears, said spiral gears being of the same chord pitch as the spur gears; a driven gear in mesh with one of the gears on the cone; means for longitudinally moving said driven gear from any spur gear over the spiral gears and to any other selected spur gear on said cone; means for moving the driven gear laterally relatively to the axis of the cone and in synchronism with the movement of said driven gear while moving from one spur gear to another; and means actuated by said lateral moving means for automatically stopping longitudinal and lateral movement of the driven gear when the same is in mesh with the selected spur gear.

13. An automatic variable speed transmission mechanism comprising a driving shaft; a cone mounted upon the driving shaft and having a plurality of spur gears arranged in spaced relation and of different diameters but of the same chord pitch; spiral gears of similar chord pitch connecting said spur gears; a driven gear in mesh with one of the spur gears; a follower connected to the driven gear and arranged to move the same longitudinally of the cone and in synchronism with the rotation of the spiral gears; means for moving the driven gear laterally relatively to the cone and in synchronism with the rotation of the spiral gears; and selective means arranged to actuate the follower to move the driven gear and the laterally moving means in synchronism therewith whereby said driven gear may be moved without interruption from any spur gear over the spiral gears to any other selected gear on said cone.

14. An automatic variable speed transmission mechanism comprising a driving shaft; a cone mounted upon the driving shaft and having a plurality of spur gears arranged in spaced relation and of different diameters but of the same chord pitch; spiral gears of similar chord pitch connecting said spur gears; a driven gear in mesh with one of the spur gears; a follower connected to the driven gear and arranged to move longitudinally of the cone and in synchronism with the rotation of the spiral gears; means for moving the driven gear laterally relatively to the cone and in synchronism with the rotation of the spiral gears; and selective means arranged to actuate the follower to move the driven gear and the laterally moving means in synchronism therewith whereby said driven gear may be moved from any spur gear over the spiral gears to any other selected gear on said cone; and means for automatically preventing further movement of the lateral and longitudinal driven gear moving means when said driven gear is in mesh with said selected gear.

In witness whereof I have hereunto set my signature.

JACQUES F. OVERWYN.